Patented Dec. 25, 1934

1,985,255

UNITED STATES PATENT OFFICE 1,985,255

PROCESS FOR THE PREPARATION OF CRYSTALLINE GLUCONIC ACID

Horace S. Isbell, Washington, D. C., assignor to the Government of the United States, represented by the Secretary of Commerce No Drawing. Application April 10, 1933, Serial No. 665,341

2 Claims. (Cl. 260—122)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government of the United States for governmental purposes without the payment to me of any royalty thereon.

This invention relates to a process for the separation of crystalline gluconic acid from aqueous solution.

Heretofore crystalline gluconic acid has been separated from solution by relatively expensive means only.

Pure crystalline gluconic acid was first described by Rehorst (Ber. vol. 63, p. 2287) although Fischer (Ber. vol. 23, p. 2625) probably obtained a crude product by the evaporation of an aqueous solution. Rehorst crystallized his product by evaporating a freshly prepared aqueous gluconic acid solution in the presence of amyl alcohol. Gluconic acid in aqueous solution forms spontaneously and reversibly two lactones. If a solution of gluconic acid is allowed to stand for some time a considerable quantity of delta lactone is formed and if the solution is concentrated gluconic delta lactone may be separated by seeding with crystalline delta lactone. This substance crystallizes readily and consequently it is usually obtained spontaneously by evaporating an aqueous solution of gluconic acid to a concentration greater than 80%.

According to my invention it is possible to separate crystalline gluconic acid easily, quickly and cheaply, without the disadvantages of the heretofore known processes, thereby giving a process suitable for large scale production. The process depends on the fact that gluconic acid will crystallize from a solution of gluconic acid containing the delta and gamma lactones in equilibrium. As the crystals separate more gluconic acid is formed on account of the equilibrium disturbance. By removing the solvent as crystallization proceeds nearly all of the gluconic acid is finally obtained in the crystalline state and there remains a liquid mother liquor containing the impurities, which impurities are separated by filtration. The process is conducted at a relatively low temperature because the acid is less soluble at the low temperature and consequently crystallizes from more dilute solutions. Concentrated solutions are avoided because on seeding with delta lactone they give that product rather than the acid and, also, gluconic acid crystallizes from concentrated aqueous solutions in poorly defined crystals forming gelatinous masses which are not readily handled except by trituration with alcohol, acetone or similar solvents.

In applying my invention an aqueous gluconic acid solution is concentrated in vacuo until saturated with respect to gluconic acid. The solution is then seeded with crystals of gluconic acid and evaporation is continued at a temperature not to exceed 60° C. As the water is removed additional gluconic acid crystals are formed. From time to time the crystals are separated by filtration and the liquors are returned to the vacuum pan, together with a fresh suply of gluconic acid. The aqueous gluconic acid is added at approximately the same rate as the crystals separate.

My process has the decided advantage over the previous methods that it does not require expensive solvents and that it may be carried out in continuous manner. The crystallization occurs during the evaporation and consequently there is little tendency to form supersaturated solutions which crystallize slowly. I prefer to use as a raw material freshly prepared aqueous gluconic acid and to avoid the formation of large amounts of lactone by conducting the evaporation rapidly at a low temperature. Lactone formation is also reduced by adding the freshly prepared acid to the material in the vacuum pan in portions as crystallization proceeds. However, the process can be applied to aqueous gluconic acid in equilibrium with its lactones with only slightly less satisfactory results.

The following examples are given by way of illustration only, and I do not wish to be limited thereto in the interpretation of my invention:

Example I

A freshly prepared aqueous gluconic acid solution containing about 30% gluconic acid is concentrated in a vacuum still at 35° C. until the concentration of gluconic acid has reached a strength of about 65%. The sirup is then seeded with crystalline gluconic acid and evaporation continued. As the crystals form freshly prepared aqueous gluconic acid is added at approximately the same rate as the crystals separate. When the vacuum pan is full the massecuite is withdrawn, and the crystals are separated by means of a centrifuge and washed. The mother liquor is returned to the vacuum pan together with additional aqueous gluconic acid. By repeating the process good yields of crystalline gluconic acid are obtained.

*Example II*

An aqueous solution of gluconic acid is evaporated in vacuo at 40° C. to a concentration of 75 per cent by weight. The sirup is then seeded with crystalline gluconic acid, placed in a flask, and rotated while crystallization takes place. After a period of time the crystals separating are collected on a filter and washed. The mother liquor may be used for repeating the process.

Crude aqueous gluconic acid containing hydrogen bromide as obtained by the electrolytic oxidation of dextrose, according to the process of my co-pending application filed February 21, 1931, Serial Number 517,627, may be used as a source of acid. In such case, after separating the crystalline acid, the mother liquors may be returned to the oxidation cell. Also, if desired, the hydrogen bromide in the crude gluconic acid solution may be replaced by hydrogen chloride. This is accomplished by introducing chlorine gas and removing the bromine set free by distillation.

In the preparation of crystalline gluconic acid from gluconic δ-lactone, gluconic γ-lactone or from ethyl gluconate the presence of a small amount of mineral acid increases the rate of hydrolysis of the raw material, thereby increasing the rate at which crystalline gluconic acid can be separated, but the presence of the mineral acid is not essential to the operation of the process.

The presence of considerable amounts of inorganic salts in the gluconic acid used as a raw material is not desirable, but the process may be satisfactorily applied to separate gluconic acid from aqueous solutions containing small amounts of salts such as are obtained by the electrolytic oxidation of dextrose in the presence of a metallic bromide.

Having thus described my invention, what I claim is:—

1. Process for the separation of gluconic acid, which consists in seeding an aqueous gluconic acid solution containing 50 to 75% dry substance with gluconic acid crystals, allowing the sirup to crystallize while being subjected to distillation in vacuo at a temperature not to exceed 60° C., and introducing into the solution aqueous gluconic acid at approximately the same rate as the crystalline product separates.

2. Process for the separation of gluconic acid which consists in evaporating an aqueous solution of gluconic acid in the presence of a mineral acid to a concentration of about 75% gluconic acid, and separating crystalline gluconic acid from the aqueous mother liquors.

HORACE S. ISBELL.